United States Patent [19]

Marsh

[11] Patent Number: 4,811,249

[45] Date of Patent: Mar. 7, 1989

[54] DATA LOGGERS

[75] Inventor: Stephen T. Marsh, Portsmouth, England

[73] Assignee: Delta Technical Services, Limited, Portsmouth, England

[21] Appl. No.: 828,848

[22] Filed: Feb. 12, 1986

[30] Foreign Application Priority Data

Feb. 15, 1985 [GB] United Kingdom ............... 8503867

[51] Int. Cl.⁴ .................. G11C 11/00; G06F 15/20
[52] U.S. Cl. .................................. 364/550; 364/900; 364/464.04; 360/6; 341/50
[58] Field of Search ............ 364/550, 551, 464, 467, 364/200, 900; 375/122, 22; 382/56; 358/133, 138; 340/347 DD; 235/310, 311; 360/5, 6; 324/77 R, 111, 121; 370/23, 83; 381/33

[56] References Cited

U.S. PATENT DOCUMENTS

| | | | |
|---|---|---|---|
| 4,072,851 | 2/1978 | Rose | 324/77 R X |
| 4,185,190 | 1/1980 | Bottard et al. | 340/347 DD |
| 4,264,956 | 4/1981 | Delaney | 364/467 |
| 4,400,783 | 8/1983 | Locke, Jr. et al. | 364/550 X |
| 4,602,333 | 7/1986 | Komori | 382/56 X |
| 4,630,211 | 12/1986 | Pettis | 364/464 |
| 4,633,483 | 10/1986 | Takahashi et al. | 375/122 X |
| 4,669,097 | 5/1987 | Bristol | 375/122 |
| 4,730,348 | 3/1988 | MacCrisken | 364/200 X |
| 4,736,327 | 4/1988 | Power | 324/77 R |

FOREIGN PATENT DOCUMENTS 1301292 12/1972 United Kingdom .

OTHER PUBLICATIONS

Goldstand, Harvey A., "Software Techniques for a Microprocessor-Based Data Acquisition Device", IEEE, 1978.

Primary Examiner—Parshotam S. Lall
Assistant Examiner—Joseph L. Dixon
Attorney, Agent, or Firm—Renner, Otto, Boisselle & Sklar

[57] ABSTRACT

A data logger for logging data wherein stored incoming data is related to real time. Incoming data initially is stored at a relatively fine time resolution in a data memory. When the capacity of the data memory is exhausted, the stored data is rearranged into a relatively coarse time resolution form and then further incoming data is collected at the relatively coarse resolution. In the event of such a change of resolution, the relationship between the stored data and real time is not distorted.

8 Claims, 5 Drawing Sheets

DATA LOGGERS

BACKGROUND OF THE INVENTION

1. Field of the Invention

This invention relates to data loggers for logging an accumulating data from a data source. The data source may be, for example, a water meter or other utility meter.

2. Description of the Prior Art

Data loggers for logging or accumulating data received from a data source, such as a water meter or other utility meter, are known. Usually, the data loggers are required only to accumulate the total consumption during the period of time between successive meter readings to that the user can be billed with the cost of the utility consumed. Accordingly, the logged data does not reflect the pattern of consumption with respect to real time.

SUMMARY OF THE INVENTION

An object of the invention is to provide a data logger which can log or store data in such a manner as to reflect the way in which the stored incoming data is related to real time.

A further object of the invention is to provide such a data logger which, when its memory capacity is exhausted after storing data at a relatively fine time resolution, can re-arrange the stored data into a relatively coarse time resolution form and then continue to collect data at the relatively coarse resolution.

A more specific object of the invention is to provide such a data logger in which, in the event of a change of resolution as just described, the relationship between the stored data and real time is not distorted.

These objects are achieved by a data logger comprising a real time clock, a data memory having a predetermined number of addresses, data accumulating means for accumulating data received after an arbitrary commencement time, and transfer means for transferring data accumulated in the accumulating means to successive ones of said addresses, and clearing the accumulating means, each time, that the real time reaches one of a plurality of predetermined positions (point in time) said positions being spaced by predetermined intervals t. The logger further comprises control means responsive to data being stored in all of said addresses to: (i) manipulate mathematically the date in an address or addresses corresponding to the unexpired portion of a real time interval of duration n.t that started before and included the arbitrary commencement time, and put the result in one of said addresses, (ii) manipulate mathematically the data in each successive group of n of said addresses and put each result in a successive one of said addresses; (iii) manipulate mathematically the data in a final group of said addresses, if the number of addresses in the final group is between zero and n, and put the result in the accumulating means, and (iv) cause the transfer means thereafter to transfer accumulated data from the accumulating means to successive ones of the addresses not containing said results, and to clear the accumulating means, each time that the real time reaches one of a predetermined positions (points in time), said positions being spaced by predetermined intervals equal to n.t.

The transfer means and control means may be constituted by a microporcessor, though other forms of implementation are possible.

Such a data logger initially collects or logs data for each of the predetermined real time intervals t in the respective addresses. If data logging is stopped before data has been transferred into all of the addresses, the data is available in that form, i.e. in a relatively fine time resolution form. If, however, data has been transferred into all of the addresses, the data logging process does not stop. Instead, the data already logged is processed or compressed into a form which it would have adopted if it had been collected for each of predetermined larger real time intervals equal to n.t., thereby freeing some of the memory space, and data thereafter is logged for each subsequent interval n.t and stored in the memory space that was freed by the compression operation. That is to say, when the memory space becomes full, the logger automatically switches over to logging data in a relatively coarse time resolution form and processes or compresses the data already collected into a consistent form. Thus, a single logger can be used, without modification, either to log data for a relatively short period at a relatively fine time resolution or to log data for a relatively long period at a relatively coarse time resolution. Furthermore, when the processing operation takes place, the logger preserves the relationship of the data with the (arbitrary) real time of commencement of data logging by (a) manipulating mathematically the data in an address or addresses corresponding to the unexpired portion of a real time interval of duration n.t that started before and included the arbitrary commencement time and putting the result in one of the addresses, and (b) manipulating mathmematically the data in a final group of the addresses, if the number of addresses in the final group is between zero and n, and putting the result in the accumulating means, rather than one of the addresses, for it to be combined with data thereafter collected at the start of data logging at the coarser or reduced time resolution.

According to a preferred embodiment of the invention described hereinbelow, the accumulating means sums or totalises the data that it receives and the above-mentioned operations of mathematically manipulating data each comprise summation of the data. Thus, in this embodiment, the logger functions as a totalising device. However, it is instead possible to perform some other form of mathematical manipulation.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3A and 3B represent the waveforms of signals applied to data (D) and clock (C) inputs, respectively, of a latch shown in FIGS. 1 and 2;

DESCRIPTION OF THE PREFERRED EMBODIMENTS

Figure 1:
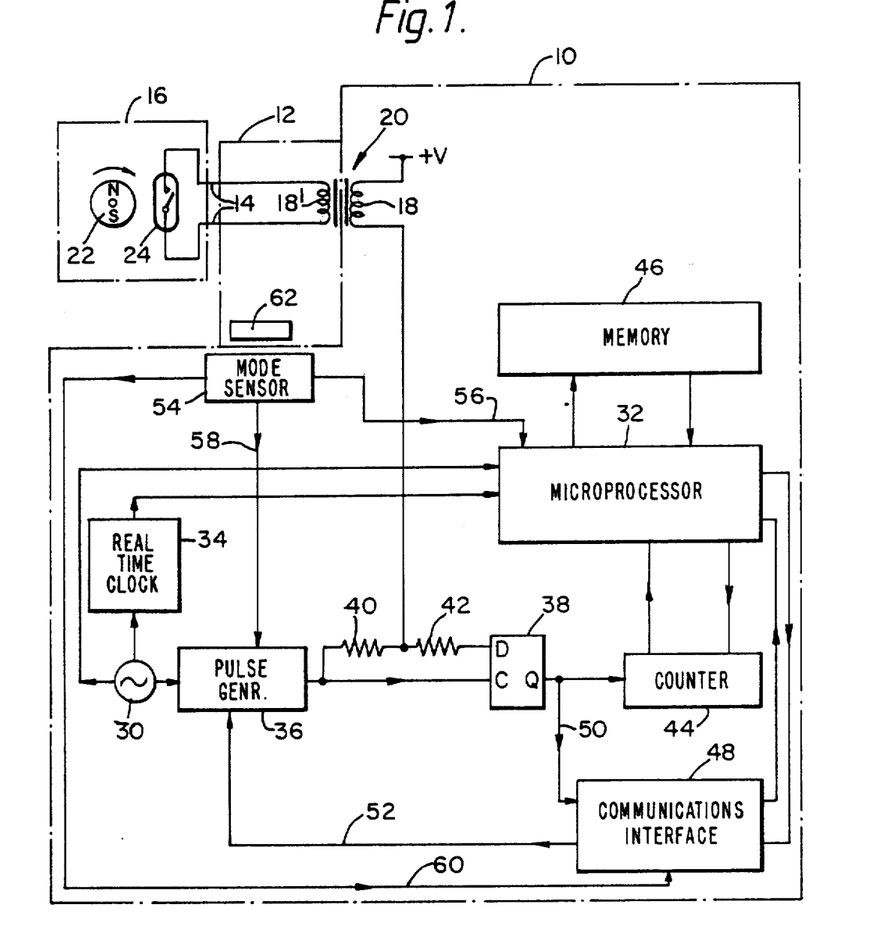
FIG. 1 is a schematic circuit diagram of a data logger embodying the invention, shown coupled (via a holder therefor) to a utility meter acting as a data source for the logger.

FIG. 1 of the accompanying drawings shows a data logger 10 embodying the present invention. The data logger 10 is shown coupled to a holder 12 therefor, the holder 12 being connected by wires 14 to a data source 16.

The mechanical construction and arrangement of the data logger 10 and holder 12 are not of direct relevance to the present invention. Details thereof may, however, be obtained from a perusal of co-pending UK patent application No. 8503868 filed Feb. 15, 1985 and assigned to the assignees hereof. Suffice it to say, for present pyurposes, that the data logger 10 may be in the form of a box which can be removably engaged with the holder 12 when data logging is to take place. The data logger 10 and holder 12 comprise respective coils 18, 18' and ferrite pot cores (not shown). When the logger 10 is engaged with the holder 12, the ferrite pot cores are urged together so that the cores, together with the coils 18, 18', cooperate to form a transformer 20 that complete (magnetically) a data collection circuit between the logger 10 and the data source 16.

The holder 12 may be fixed in place in vicinity of the data source 16. Data collection is commenced simply by engaging a data logger 10 with the holder 12, whereupon the logger is coupled magnetically to the holder (and thereby to the data source 16) via the transformer 20. Data collection is terminated simply by disengaging the logger 10 from the holder 12.

The data source 16, which for purposes of the following description is assumed, for example, to be a water meter, has fitted therein a disk-like magnet 22 which is arranged to rotate at a rate proportional to the rate of consumption of water. The magnetic polarity of the magnet 22 is represented schematically in FIG. 1 by north (N) and south (S) poles. The magnet 22 is positioned adjacent a magnetic reed switch 24. Thus, the reed switch 24 will be closed or opened, depending upon the angular position of the magnet 22. Accordingly, the number of closures (or openings) of the reed switch 24 is proportional to water consumption.

Figure 2:
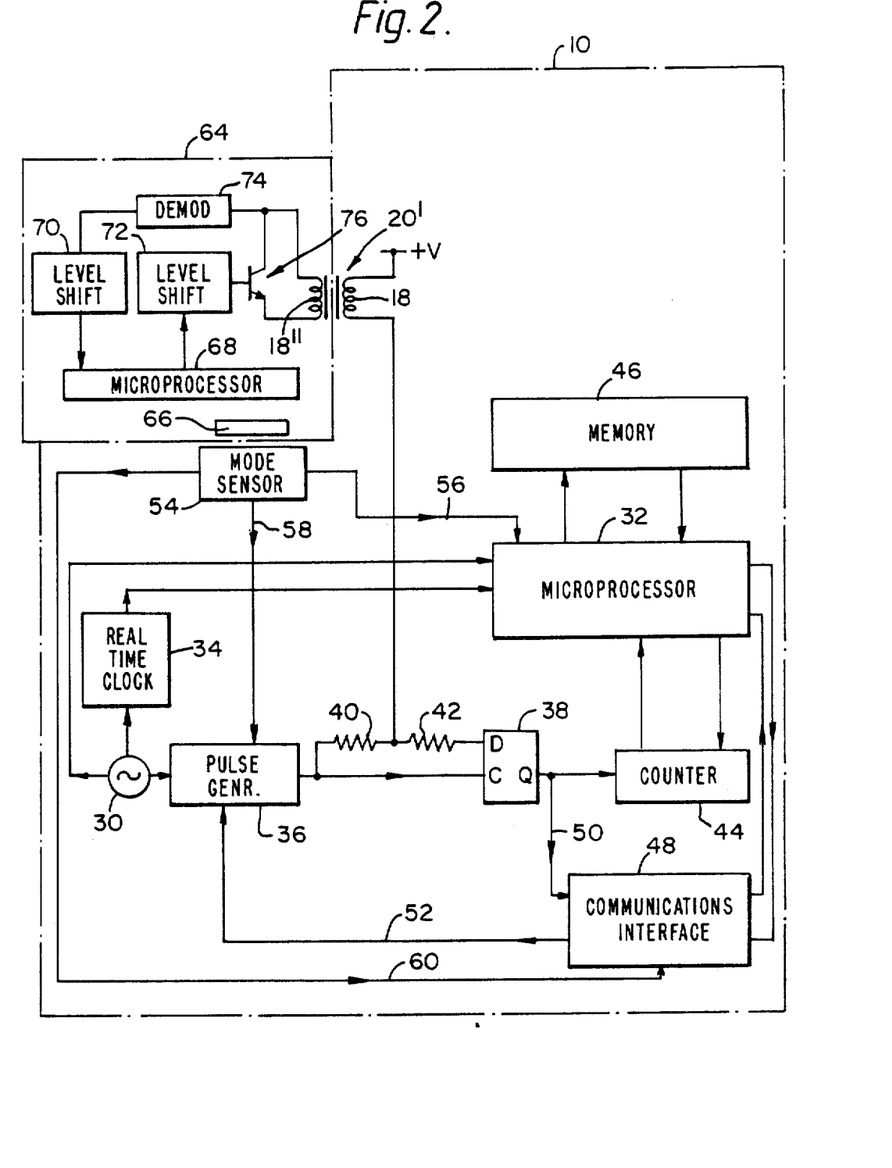
FIG. 2 is a schematic circuit diagram corresponding to FIG. 1, but showing the logger coupled to a support station for interrogating the logger, i.e. for extracting data that has been stored by the logger during a logging operation.

The logger 10 accommodates a power source (battery) for powering the circuitry shown schematically in FIGS. 1 and 2. Such circuitry includes an oscillator 30 which is connected to a microprocessor 32 (e.g. an N.C.E. 8035 or an N.E.C. 7508), a real time clock 34 and a pulse generator 36. The oscillator 30 produces outputs having a frequency of, for example, 32.768 kHz. The micproprocessor 32 utilizes its output from the oscillator 30 for its own internal processing. The real time clock 34, which is set prior to commencement of a data logging operation, is driven by the oscillator 30 and is connected to the microprocessor 32 so that the microprocessor is always kept apprised to the real time. The pulse generator 36 is responsive to its output from the oscillator 30 to produce a pulse train at either of two frequencies. In a data logging mode, as shown in FIG. 1, the pulse train is in the form of a train of sampling/clock pulses at a low frequency of, for example, 64 Hz. (To maximise battery life, the pulses are produced at a low or narrow duty cycle, preferably less than 0.1%, e.g. 0.038%.) In a data interrogation or reading mode, as shown in FIG. 2, the pulse generator 36 produces pulses at a relatively high frequency of, for example, 32.768 kHz.

An output of the pulse generator 36 is connected to a data (D) input of a D-type flip-flop or latch 38, via resistors 40 and 42,, and is connected directly to a clock (C) input of the latch 38. The latch 38 may, for example, be a Motorola 4013, with the data (D) input being used, as described below, as an analog threshold detector. A counter 44 is connected to an output (Q) of the latch 38 (Although shown separately from the microprocessor 32, at least part of the counter 44 may in fact be incorporated in the microprocessor). The junction between the resistors 40, 42 is connected via the coil 18 of the transformer 20 to a positive reference potential (+V).

The microprocessor 32 is connected to the counter 44 and to a memory 46 to enable the microprocessor 32 to read from and write to both the counter 44 and memory 46.

A communications interface 48 has a serial input which is connected by a line 50 to the output (Q) of the latch 38 and a serial output which is connected by a line 52 to the pulse generator 36.

A mode sensor 54 is shown connected to the microprocessor 32 (line 56), the pulse generator 36 (line 58) and the communications interface 48 (line 60). The mode sensor 54 is operative to sense whether the logger 10 is in one of three modes (a data logging mode, a data interrogation mode and a quiescent or transit mode) and to regulate the circuitry of the logger to act accordingly.

The mode sensor 54 comprises a pair of magnetic reed switches. When, as shown in FIG. 1, the logger 10 is in the data logging mode, that is to say is it positioned in the holder 12, the mode sensor 54 detects that it is positioned adjacent a magnet 62 in the holder 12 by virtue of the magnet 62 closing one of the reed switches. The mode sensor 54 then disables the communications interface via the line 60, since the communications interface is not needed in that mode, and indicates to the microprocessor 32 (via the line 56) that it should cause the logger 10 to enter the data logging mode so that data logging will commence. Assuming that the logger 10 was previously in the quiescent mode and is so constructed that the pulse generator 36 will emit the 64 Hz pulse train in the quiescent mode, logging can be commenced simply by the microprocessor 32 clearing the counter 44. It is, however, within the scope of the invention for the pulse generator 36 to be turned off in the quiescent mode, in which case the pulse generator will be turned on (at 64 Hz) via the line 58 on commencement of logging.

In the data interrogation mode, in which the logger 10 is coupled to a remote support station 64 (FIG. 2), a magnet 66 closes the other of the reed switches in the mode sensor 54, as a result of which the mode sensor indicates that the logger 10 is in the data interrogation mode. The mode sensor 54 indicates this fact to the microprocessor 32 via the line 56. Also, it enables the communications interface 48 via the line 60 so that interrogation can take place in a manner that is described hereinbelow. Further, the mode sensor 54 is operative via the line 58 to cause the pulse generator 36 to emit the high frequency pulse train (32.768 Hz).

Finally, in the quiescent or transit mode, in which the logger 10 is coupled neither to the holder 12 nor to the support station 64, the fact that there is no magnet adjacent the mode sensor 54 leads to both the reed switches thereof being open. In this mode, in order to conserve power, some of the circuitry of the logger 10 is disabled, though at least the oscillator 30 and real time clock 34 will remain powered.

Referring to FIG. 2, in the date interrogation mode the logger 10 is coupled to the support station 64 in a manner similar to that in which it is coupled to the holder 12 in the data logging mode. That is to say, the support station 64 is provided with a coil 18" and a ferrite pot core similar to the coil 18' and ferrite pot core of the holder 12, the two pot cores and the coils 18, 18" cooperating to form a transformer 20' which, in the data interrogation mode, couples the logger 10 to the support station 64.

The support station 64 includes a microprocessor 68 which is coupled via a pair of level shift units 70, 72, a demodulator 74 and a transistor 76 to the transformer 20". The level shift units 70, 72 are standard RS 232 information exchange standard units provided to interface the microprocessor 68 of the support station 64 with the logger 10.

The operation of the logger 10 will now be described. It is assumed that a number of data sources 16 are to be subjected to logging from time to time by engaging loggers 10 with their associated holders 12 as and when required. The real times of commencement and termination of logging of the different data sources 16 will be arbitrary and different and, once logging is complete, the loggers 10 will be delivered to the or a remote or central support station 64 for interrogation (i.e. retrieval of data) by the microprocessor 68 of the central support station. It is important that the relationship of the retrieved data with the real time at which it was logged be preserved.

Assume that a particular logger 10 is to be fitted to the holder 12 associated with a particular data source 16. The logger 10 has previously been interrogated by the support station 64 at the end of a previous logging operation, as a result of which its real time clock has been set and the counter 44 has been cleared, as also has that part of the memory 46 in which, as is explained subsequently, data has been stored. Prior to installation in the holder 12, the logger 10 is in the transit or quiescent mode in which, as explained above, power consumption is limited.

The logger 10 is then engaged with the holder 12. The mode sensor 54 then, as indicated above, is responsive to the proximity of the magnet 62 to signal the start of the data logging mode. The microprocessor 32 records or stores in the memory 46 the (arbitrary) real time of commencement of data logging as indicated by the real time clock 34. The pulse generator emits the above-mentioned low duty cycle 64 Hz pulse train. Completion of the circuit between the data source 16 and the logger 10, via the holder 12, caused by engagement of the logger with the holder 12, completes the circuit shown in FIG. 1 and the logger 10 starts to accumulate the number of closures of the reed switches 24, that is to say to accumulate water consumption with respect to real time,, as will now be described.

FIG. 3A shows one of the 64 Hz pulses from the pulse generator 36 as it appears at the data (D) input of the latch 38. As will be appreciated, the transformer 20 and resistor 40 can be considered to form a sort of potential divider which affects the amplitude of the pulse at the data (D) input of the latch 38. Specifically, since the side of the transformer 20 opposte to the coil 18 will be short circuited or open circuited in dependence upon whether the reed switch 24 is closed or open, the shape of the pulse as appearing at the data (D) input of the latch 38 will depend upon whether the reed switch 24 is closed or open. That is to say, the pulse acts as a sampling pulse to sample the state of the reed switch 24. The solid line in FIG. 3A shows the shape of the pulse for the case when the reed switch 24 is closed. As will be seen, the amplitude, of the pulse decays rapidly. The dotted line in FIG. 3A shows the shape of the pulse when the read switch 24 is open. In this case, the pulse amplitude decays much less rapidly.

FIG. 3B shows a pulse from the pulse generator 36 as applied to the clock (C) input of the latch 38. As will be seen, this pulse, which can be considered to be a clock pulse, is sightly advanced in time with respect to the pulse applied to the data (D) input, which is due to the fact that the pulse applied to the data (D) input is slightly delayed by an R-C network constituted by the resistor 42 and capacitance associated with the resistor. As is known to those skilled in the art, a D-type flip-flop or latch will respond to the state of its data (D) input at the time of a positive-going level change at its clock (C) input, which positive-going level change is provided by the trailing edge of the pulse supplied to the clock (C) input. The decision level of the data (D) input is represented at 80 in FIG. 3A. As will be seen from comparing FIG. 3A and 3B, the level of the pulse at the data (D) input will be determined as being of high level (level "1") if the reed switch 24 is open and will be determined as being of low level (level "0") if the reed switch 24 is closed.

Figure 4:
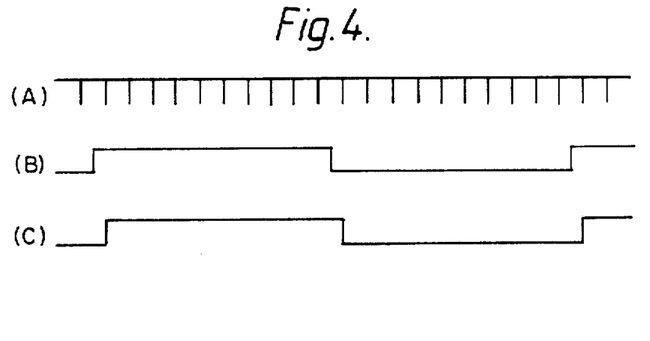
FIGS. 4A, 4B and 4C represent waveforms of other signals present in the circuit shown in FIG. 1 during a data logging operation.

FIG. 4A shows the train of pulses supplied by the pulse generator 36. FIG. 4B shows the status of the reed switch 24, where the high level represents the switch being open and the low level represents the switch being closed. Suppose that, as represented by the first rising edge in FIG. 4B, the reed switch 24 has just gone from closed to open. Generally, this will take place between two of the pulses shown in FIG. 4A. At the occurrence of the next pulse subsequent to opening of the switch 24, the latch 38 will clock in level "1" whereby the output Q of the latch 38, which is represented in FIG. 4C, will go from a low level to a high level. At each pulse occurring whilst the switch 24 remains closed, the latch 38 will again clock in level "1" and the output Q will therefore not change. However, upon the occurrence of the next clock pulse subsequent to the switch 24 again closing, the latch 38 will clock in level "0" and the output Q of the latch 38 will go low. Consequently, the output Q of the latch 38, as represented in FIG. 4C, follows the state of the reed switch 24, rounded off to the nearest clock pulse at each end. Therefore, the output G of the latch 38, as accumulated in the counter 44, is representative of the consumption of water detected by the meter 16.

The logger 10 is operative to log the data is collects during each of a plurality of predetermined real time increments or intervals of duration t that extend between predetermined real time positions (instants). To this end, each time that the microprocessor 32 determines (by monitoring the real time clock 34) that onee of the real time positions (instants) has been reached, i.e. that one of the predetermined increments t has ended, the microprocessore is operative to transfer the contents of the counter 44 to the memory 46 and to clear the counter 44 so that it thereafter can accumulate data during the next predetermined real time increment t.

Figures 3, 5:
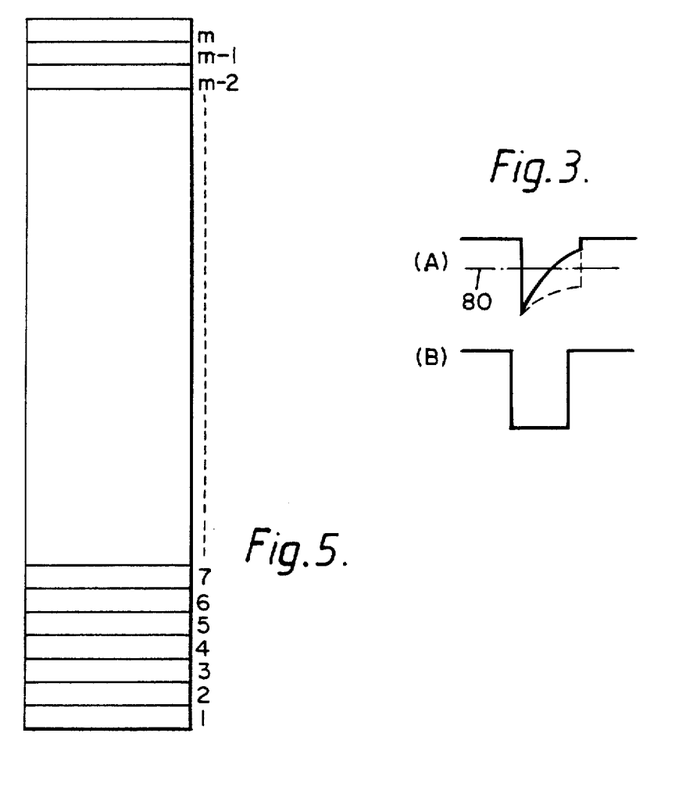
FIG. 5 is a map of a part of memory shown in FIGS. 1 and 2 that is allocated to the collection of logged utility consumption data.

The memory 46 includes a part for storing a program for operating the microprocessor as described in detail below with reference to FIG. 8 and other parts for storing data acquired during logging. A map of a part of the memory 46 to which is allocated the task of storing water consumption data collected during the respective predetermined real time increments or intervals t is shown in FIG. 5. This part of the memory is shown as having m slots or segments, numbered 1 to m, in each of which is stored the data accumulated in the counter 44 during m consecutive real time increments t, commencing with the increment that includes the arbitrary start time of data collection. The m individual slots or segments will hereinafter be referred to, for convenience, as "addresses". However, this is not to be taken to mean that there is necessarily any one to one correspondence between the m slots or segments and particular addresses of the memory.

As data logging continues, the part of the memory allocated to the task of storing water consumption data (which part will hereinafter be referred to simply as "the memory") will fill up. More specifically, it will become full after the lapsing of a period of time equal to m.t, where t is the duration of the predetermined real time increments and the period in question commences at the start of the increment t prior to the commencement of logging.

As will be appreciated, in the normal course of events data logging would have to stop when the memory is full. It has, however, been suggested that data logging could carry on, at a relatively coarse time resolution, if the following measures were taken. The addresses 1 to m would be subdivided into groups of n addresses. In a first group (addresses 1 to n), the contents of the addresses would be summed, the addresses cleared, and the sum put back into one of the cleared addresses, for example address 1. The same operation would be performed for the next group of n addresses, and the sum put into another cleared address, for example address 2. If this operation were then performed for all of the groups of n addresses, only m/n of the addresses would contain data and the remaining addresses would be free. In the m/n addresses containing sums derived as above, the data would correspond to the form that it would have adopted if the data had been logged over larger real time increments or intervals of duration equal to n.t. Data logging could then continue over the larger real time increments (n.t). The outcome of this would be that the logger could continue to collect data, albeit at a relatively coarse time resolution, over a total period equal to n.m.t.

At first sight, the above-described data compression technique would seem to be a good idea in that it would enable a single logger 10 to be used, without modification, either to log data for a relatively short period at a relatively fine time resolution or to log data for a relatively long period at a relatively coarse time resolution. If real time were not relevant, that would be so. However, simply compressing the data as described above would ruin the relationshipof the logged data with respect to real time. Why this is so will now be explained with reference to FIG. 6.

Figure 6:
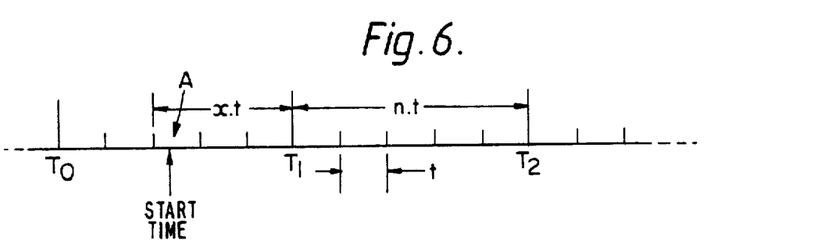
FIG. 6 is a time graph showing relatively fine and coarse real time intervals or increments employed during different stages of data logging and their temporal relationship with an arbitrary real time ("start time") at which data logging is commenced.

FIG. 6 is a time graph in which the small graduations represent the boundaries (real time positions or instants) between the initial, relatively fine real time increments or intervals of duration t and the large graduations ($T_o$, $T_1$ etc.) represent the boundaries (real time positions or instants) between the relatively coarse real time increments or intervals having durations equal to n.t. By way of example only,, n is shown in FIG. 6 as being equal to 5. That is to say, each of the larger real time increments is congruent with a respective five consecutive smaller time increments t. To assist in comprehending FIG. 6 and the following description it can be assumed, purely for the sake of illustration, that the smaller real time increments (t) are ach equal to 0.2 hours (12 minutes) and that the larger real time increments are therefore each equal to 1 hour. Again for the s of illustration, the instants $T_o$, $T_1$, $T_2$ etc. can be considered to be the real times 1000 hours, 1100 hours, 1200 hours, etc.

The time of commencement of data logging is, as indicated above, arbitrary. It may, for example, represent the time that a water utility official gains access to premises fitted with the data source 16 and holder 12 and engages a logger 10 with the holder 12. Suppose that, for example, the time of commencement of logging ("start time") is around 1030 hours. Thus, data logging starts during an increment or interval designated A in FIG. 6, namely during the interval commencing at 1024 hours. At 1036 hours, the contents of the counter are transferred to address 1. At 1048 hours, the contents of the counter are transferred to address 2; and so on. Thus, prior to the memory becoming full, there is a one to one correspondence between the contents of the addresses and time increments or intervals of 0.2 hours (12 minutes) commencing at 1024 hours. Thus, the memory accurately records water consumption over 12 minute increments or intervals in real time and, provided the start time is recorded, this applies also to the first time increment or interval (A) even though logging did not commence right at the start of that interval.

If the above-described compression technique were then adopted, the object would be to achieve, after compression, a relationship between real time and stored data in accordance with which address 1 would contain data logged between the real time instants 1000 hours ($T_o$) and 1100 hours ($T_1$) on the day of installation, address 2 would contain data accumulated between the real time instants 1100 hours ($T_1$) and 1200 hours ($T_2$) on the day of installation, and so forth. However, if the compression technique were carried out as described above, the desired relationship between the stored data and real time would be ruined. This is because, for the example illustrated above and shown in FIG. 6, only addresses 1 to 3 contain data relating to the interval between the real time instants $T_o$ and $T_1$. Therefore, if the first five addresses were summed and put into one of the cleared addresses, the content of that address would not represent data logged between 1000 hours and 1100 hours but, rather, data accumulated between 1024 hours and 1124 hours. That is to say, the desired relationship between the stored data and real time would be "out of phase" by 24 minutes per hour. Clearly, the degree of disparity would vary in dependence upon the actual start time. If, for example, the start time were between 1048 hours and 1100 hours, there would be a disparity of 48 minutes whereas, if the start time were between 1000 hours and 1012 hours, there would be no disparity.

Further, the disparity would continue during data logging, at reduced time resolution, after the compression operation. This is because the top group of n addresses will generally contain data relating to two adjacent ones of the larger real time increments of duration n.t.

The way in which the above-described disparity is overcome in the present logger will now be described briefly with reference to FIG. 7 and then described in more detail with reference to FIG. 8.

FIG. 7 shows again the memory map shown in FIG. 5. In addition, the real time boundaries of the larger time increments $T_0$, $T_1$, etc., as corresponding to the memory contents prior to the compression operation, are shown down the left-hand side of the memory map in FIG. 7. Further, various summation steps described below are shown down the right-hand side of the memory map in FIG. 7.

As will be evident, the real time instant $T_1$ (1100 hours) does not, for the example described with reference to FIG. 6, correspond to the boundary between addresses 5 and 6. Rather, it is located after address 3. Therefore, in the present logger, and for the above example, initially only the contents of the first three addresses (addresses 1 to 3) are summed. More generally, the data compression operation comprises an initial step of summing only the data in that address or those addresses corresponding to the unexpired portion of the real time increment (the interval between the real time instants $T_0$ to $T_1$) of duration n.t that started before and included the arbitary commencement time, such sum being put into one of said addresses. The number of addresses whose contents are summed in the initial step will, depending upon the actual start time, vary between 1 and n (5). Then, the data in each successive group of n (5) of the addresses is summed and put into successive addresses. In this way, the real time relationship between the compressed data and real time is preserved. Provided the start time is recorded, the data figure for the first of the larger time increments or intervals ($T_0$ to $T_1$ or 1000 to 1100 hours) will be accurate, even though data was not logged over the whole of that period. Clearly, for each successive larger time increment equal to n.t, there will be an accurate and one to one correspondence between the compressed stored data and real time.

As indicated above, the number of addresses whose contents are summed in the initial step may vary from 1 to n. If the number of addresses whose contents are summed in the initial step is less than n, the number of addresses in the top or final group of addresses also will be less than n, since m is an integral multiple of n whereby the number of addresses in both the initial and final groups must total n. In the example shown in FIG. 7, the initial group comprises the addresses 1 to 3, whereby the final group comprises the addresses m and m-1. The contents of the final group of addresses, where the number of addresses m the final group is less than n, represents data stored during a real time increment of duration n.t that has already commenced, i.e. that commenced before the data compression operation. The contents of the final group are summed. However, if the number of addresses in the final group of addresses is less than n, then to preserve the relationship between the data and real time, this sum is not put into a memory address. Instead, the sum is put into the counter 44 to be accumulated together with data accumulated by the counter during the remainder of the real time interval of duration n.t that commenced before the date compression operation. At the end of that real time interval, the data accumulated in the counter 44 therefore accurately reflects data relevant to that time period and is then transferred to the next free addresss.

Figure 7:
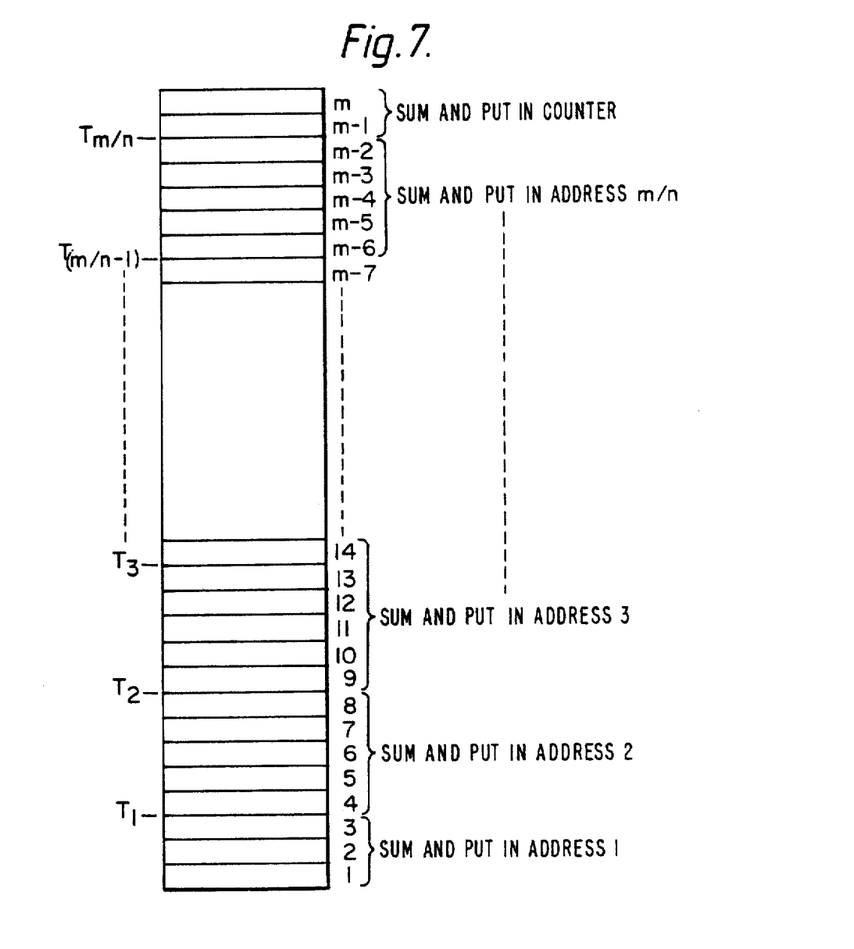
FIG. 7 shows again the memory map illustrated in FIG. 5, but includes further information showing (i) the relationship between data stored therein during a first stage of logging data at a relatively fine time resolution and (ii) a stored data compression operation performed at the end of the first stage, after which logging data at a relatively coarse time resolution is commenced.

The description of the data compression given above with reference to FIG. 7 mentioned an initial summation or compression step (addresses 1 to 3), plural consecutive summation or compression steps (addresses 4 to 8, 9 to 14 etc.) and a final summation or compression step (addresses m and m-1). While it may be convenient to carry out the steps in that order, it should be appreciated that there is no sigificance to the order in which these steps are carried out. In principle, any other sequence of summation of the various address groups, or even parallel summation, could be employed.

Figure 8:
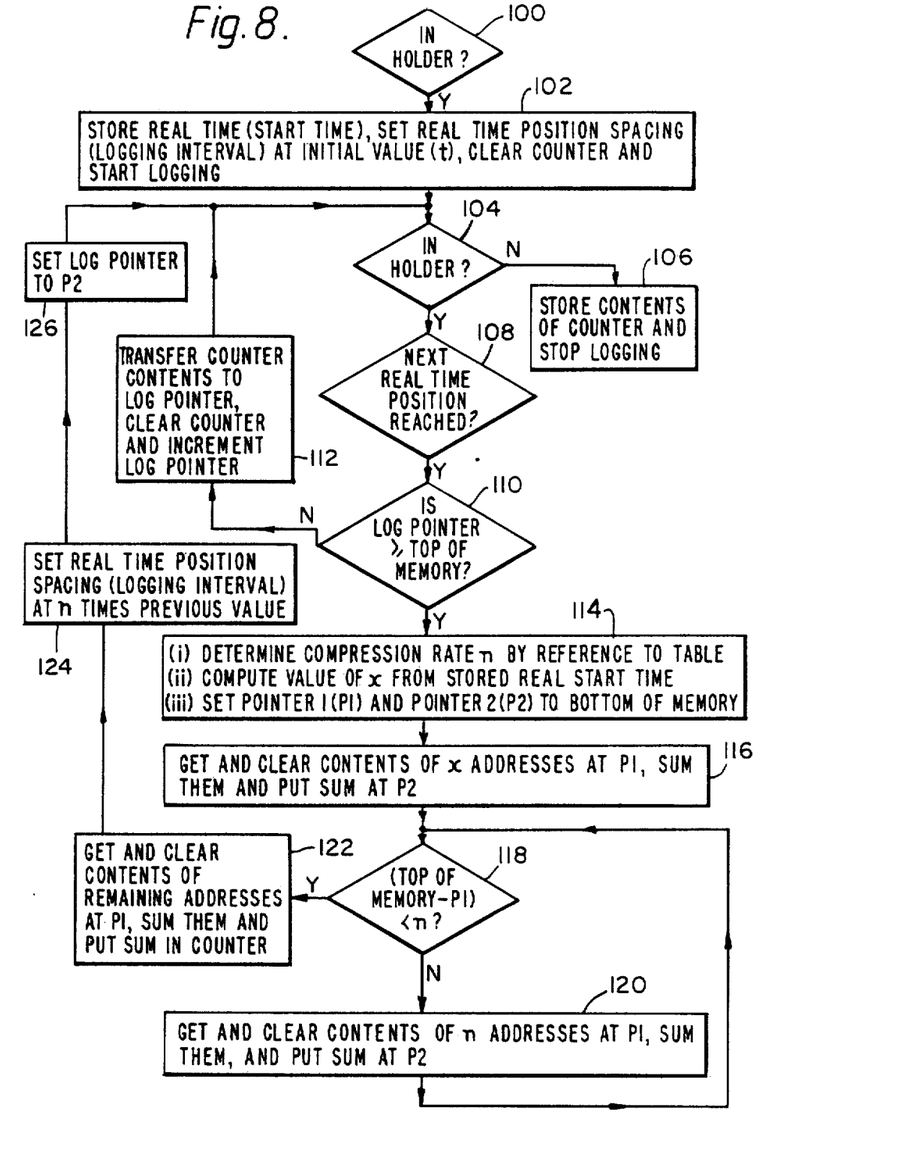
FIG. 8 is a flow diagram illustrating the operation of the logger.

FIG. 8 is a flow diagram representing the operation of the logger 10 during the data logging operation. In a decision step block 100, the microprocessor 32 checks by means of the mode sensor 54 whether the loggger 10 is in the holder 12. If the answer is "yes", as signified in conventional manner by the letter "Y", the operation indicated in a block 102 are carried out. Specifically, the microprocessor 32 stores the real time of commencement of logging ("start time"), as indicated by the real time clock 34. Also, the real time position spacing or logging interval, namely the increments or intervals (related to real time) at which the contents of the counter 44 are transferred to the memory 46, is set at the initial value t. Further, the counter 44 is cleared and starts to accumulate the number of closures of the reed switch 24 as described above.

The check that the logger 10 is in the holder 12 is then repeated (block 104). In fact, rather than being carried out at this specific point in the sequence, the check that the logger 10 is in the holder 12, as performed by the mode sensor 54, may in fact be performed continuously or at least at intervals.

If the answer to the check carried out by block 104 is "no", as indicated in conventional manner by the letter "N", that is to say the logger 10 is disengaged from the holder 12 and therefore is in the transit or quiescent mode, the contents of the counter 44 are transferred to and stored in the memory 46 and logging is stopped: see block 106.

Assuming that the logger 10 remains in the holder 12, the next step is to determine (block 108) whether the next real time position has been reached. That is to say, the microprocessor 32 monitors for the next real time instant corresponding to a boundary between the smaller of initial real time intervals of duration t, as represented by the smaller graduations in FIG. 6. When such a position has been reached, the microprocessor then determines (decision block 110) whether an integer variable termed "LOGPOINTER" is greater than or equal to "top of memory". That is to say, the microprocessor 32 checks whether an address pointer (LOGPOINTER) corresponding to the position of the last address in the memory map shown in FIG. 7 having data therein is equal to or greater than an address (address m) corresponding to the top of memory. Put more simply, a check is made as to whether the memory is full. If the answer is "no", the operations indicated in a block 112 are carried out. Specifically, the contents of the counter 44 are transferred to the address indicated by the value of LOGPOINTER, the counter is cleared, and the value of LOGPOINTER is incremented. The procedure then loops back to the input of the block 104 and continues until, as indicated by a "yes" output from the decision block 110, it is determined that the memory is full.

In the event of the memory being full, the operations indicated in a block 114 are carried out. Firstly, the compression rate n, namely the ratio between the durations of the larger and smaller (initial) logging intervals or increments, is determined by reference to a table that may be stored in another part of the memory 46. Secondly, by reference to the stored real start time, the value of an integer x is computed. As can be seen by reference to FIG. 6, x is equal to the number of the smaller time increments t between the start of the smaller time increment that includes the start time and the end of the larger time increment that includes the start time. For the example shown in FIG. 6, x is equal to 3. More generally, x may vary between 1 and 5. The third operation performed by the block 114 is to set two pointers P1 and P2 to the bottom of memory, that is to say, assuming that a compression operation has not previously been performed, to address 1.

Next (block 116) the contents of the x addresses at the pointer P1 are obtained, those addresses are cleared, and the sum is put in the address at the pointer P2. (This operation is a more general expression of the operation expressed as "SUM AND PUT IN ADDRESS 1" at the bottom of the list of comments down the right-hand side of the memory map in FIG. 7).

A check is then made (decision block 118) as to whether the number of addresses remaining before the top of memory is less than n. Naturally, at this time, the answer will be "no". Therefore, the operations indicated in a block 120 are carried out. That is to say, the contents of the n addresses at the pointer P1 are obtained, those addresses are cleared, the obtained contents are summed and the sum is put in the address indicated by the pointer P2. The procedure then loops back to the input of the decision block 118 whereby the compression operation indicated by the block 120 is carried out for each successive group of n addresses. (This repeated operation corresponds to the expressions "SUM AND PUT IN ADDRESS 2" to "SUM AND PUT IN ADDRESS m/n" on the right-hand side of the memory map in FIG. 7).

As has been indicated above, and as will be appreciated from a careful study of FIGS. 6 and 7, any disparity between stored data and real time at the bottom of memory is reflected at the top of memory. That is to say, if, as in the example illustrated, in order to preserve the real time relationship it is necessary to sum only the contents of the first three addresses in the initial step, there will be a final group of two addresses "left over" or remaining at the top of memory. Moreover, again as indicated above, it would be wrong to transfer the summed contents of the final group of addresses at the top of memory back into an address in memory, if the number of addresses in that group is less than n, because the sum represents data accumulated during a current one of the larger real time increments or intervals that is only partially complete. So, as indicated by a block 122, the contents of the final group of addresses at the top of memory, where the number of addresses in this group is less than n (or, to be more precise, is between zero and n), is instead summed and put into the counter 44 to be accumulated with data received during the remaining portion of the current larger time interval. Naturally, if the time of commencement of logging had been within the first time increment of duration t after a boundary between two of the larger time increments of duration n.t (e.g. if, in the above example, logging commenced between 1000 hours and 1012 hours), the number of addresses in both the initial and final groups would be n and the steps shown in the block 122 need not be carried out. Therefore, strictly speaking, FIG. 8 should show a further decision step which would be carried out in parallel with the decision of the block 118 and which would bypass the block 122 if it detected that the number of addresses in the final group is equal to n. For clarity and simplicity, this extra decision step is not shown in FIG. 8.

Next, as represented by a block 124, the real time position spacing or logging interval, namely the intervals at which data is transferred from the counter 44 to the memory 46, is set to be at a value equal to n times the original value t. Accordingly, thereafter, the data logging operation proceeds as before, save that the contents of the counter 44 are transferred to the memory at intervals equal to n times the previous value.

Naturally, when data thereafter is transferred from the counter 44 to the memory 46, it must start to fill up the address spaces starting with the next address space above that occupied by data summed as a result of summing the contents of the highest group of five addresses during the above-described data compression operation. To this end, as represented by a block 126, the value of the address pointer "LOGPOINTER" is set to the value of the pointer P2 which, as will be appreciated, represents the address above the highest address containing a sum resulting from the data compression operation. The procedure then loops back to the input of the decision step 104 and proceeds as described above.

As will be appreciated from considering the flow diagram of FIG. 8, once the memory again becomes full the compression operation is repeated and data is thereafter logged at an even coarser time resolution. In principle, this operation can be repeated indefinitely, though it may be appropriate, for practical reasons, to incorporate in the procedure set forth in FIG. 8 a limit on the number of compression operations. It is within the scope of the invention for the number of compression operations to be any number equl to or greater than one.

When data logging is eventually complete, the logger 10 is removed from the holder 12. As described above, the logger 10 then enters the transit or quiescent mode. Also, the real time at which logging is stopped is recorded in the memory 46 by the microprocessor 32. The logger 10 is then taken to the support station 64 and coupled thereto as shown in FIG. 2. Then, again as described above, the logger 10 is put by the mode sensor 54 into the interrogation mode. In this mode, the communications interface 48 is enabled. Also, the pulse generator is caused to produce the high frequency pulse train (32.768 kHz). The microprocessor 32 then causes data stored in the memory 46 to be transferred to the communications interface 48 from which is emerges in serial form on the line 52 and is passed to the pulse generator 36. (The data transferred to the communications interface 48 comprises the recorded real times of commencement and stopping of logging, the data stored in the addresses 1 to m, and the current (final) value of the logging increment or interval). In the pulse generator 36, the 32.768 kHz pulse train is amplitude modulated by the data emerging from the communications interface 48. The modulated data is passed to the support station 64 via the transformer 20'. The data is then demodulated by the demodulator 74 and passed via the level shift unit 70 to the microprocessor 68 in the support 64 where it can, for example, be put into readable form or, again by way of example, correlated with data obtained from other loggers to obtain a pattern of water consumption and/or leakage or the like over a desired area.

During and/or after the operation of retrieval of data from the logger 10 by the support station 64, the microprocessor 68 of the support station may issue command signals to the microprocessor 32 of the logger 10. These command signals may be used to set up various facilities in the logger 10, for example to set the real time clock 34 therein. The command signals are issued via the level shift unit 72, the transistor 76, the transformer 20' and the resistor 42 to the data (D) input of the latch 38. In the latch 38, the command signals are processed in similar manner to the way in which the signals from the reed switch 24 are processed when the logger 10 is in the data logging mode, save that the clock pulses are in this case supplied to the clock (C) input of the latch at a frequency of 32.768 kHz. The command signals appearing at the output Q of the latch 38 are passed via the line 50 to the serial input of the communications interface 48, which passes them on to the microprocessor 32.

Although the logger is described above as being applied to the logging of data from a source 16 in the form of a water meter, it will be evident that it can be applied also to collecting or logging data from various other sources. Thus, as is immediately evident, the logger can log data from any other data source 16 than a water meter in which the data is represented digitally by closures of a reed switch or other switch. In can likewise accumulate data in analog form, e.g. pressure, if the source is provided with an analog to digital (A/D) converter which will simulate switch closures. The logger could further be designed so as regularly to emit, via the transformer 20, pluses to synchronize or trigger electronic circuitry associated with the data source and/or holder, for instance to cause the above-mentioned A/D converter to sample a reading of pressure or the like.

The preferred embodiment of the invention described above by way of example can of course be modified within the scope of the invention. Examples of some such modifications are detailed below. Other such modifications will, of course, be apparent to those skilled in the art from a study of this specification.

Although, as indicated above, logging commences when the logger 10 is installed in the holder 12 and is stopped when the logger is withdrawn from the holder, it is not necessary that logging should commence or stop at the moment of installation or removal. If desired logging can start or stop after the elapsing of a predetermined interval subsequent to installation or removal.

Although in the preferred embodiment described above the counter 44 sums or totalizes the data that it receives and that sum is transferred into the memory at the end of each logging interval, and, when the memory is full, the contents of groups of addresses thereof are summed and put back in the memory or into the counter, this is necessary only when the memory is intended to record a totalization of the data received over the logging interval. In other applications, other mathematical manipulation than summing may be employed. For example, the logger may be required to perform averaging of the data received during each logging interval, in which case the data stored in each address may represent the average (rather than the sum) of data received during a logging interval and, when the memory is full, the contents of the groups of addresses may be averaged (rather than simply summed) before being put back into memory or into the counter.

It is not necessary that, once logging has commenced, it should continue without interruption until the logger 10 is withdrawn from the holder 12. The logger 10 may be provided with a time window function, according to which the microprocessor 32 makes the logger operative only during a predetermined part of each of a succession of predetermined time periods. For example, the logger may be operative only during a predetermined part of each successive 24 hours, which part need not be a part of a particular day (0000 to 2400 hours) but might span two successive days. Such windowing is fully compatible with the arrangement described above. When the memory is full, stored data compression (memory expansion) takes place in the same manner as it does when there is no windowing facility. Also, if logging happens to commence at an arbitrary real time within the time window, the compression operation will once more be such as to ensure that the first data sum (bottom of memory) is only of the contents of a number of addresses appropriate to the actual commencement time and that the final data sum (top of memory) is "carried forward" into the counter to be added to the data accumulated during the subsequent operation of logging at a coarser time resolution. The time window may, for example, be an integral number of hours. In this case, in order to preserve the relationship between data and time, data compression stops when data has been compressed to once hour intervals, whereby the support station can calculate the correct time summation within the time window. More generally, if the window can be set in units of time equal to TW, then data should not be compressed beyond intervals equal to TW.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data logger comprising:
 a real time clock;
 a data memory having a predetermined number of addresses;
 data accumulating means for accumulating data received after an arbitrary commencement time;
 transfer means for transferring data accumulated in said accumulating means to successive ones of said addresses, and clearing said accumulating means, each time that the real time reaches one of a plurality of predetermined points in time that are spaced by predetermined intervals t, and control means responsive to data being stored in all of said addresses to:

(i) manipulate mathematically the data in an address or addresses corresponding to the unexpired portion of a real time interval of duration n.t that started before and included said arbitrary commencement time, and put the result in one of said addresses, (ii) manipulate mathematically the data in each successive group of n of said addresses and put each result in a successive one of said addresses, (iii) manipulate mathematically the data in a final group of said addresses, if the number of addresses in the final group is between zero and n, and put the result in said accumulating means, and (iv) cause said transfer means thereafter to transfer accumulated data from said accumulating means to successive ones of said addresses not containing said results, and to clear said accumulating means, each time that the real time reaches one of a plurality of predetermined points in time that are spaced by predetermined intervals equal to n.t.

2. A data logger according to claim 1, wherein each said mathematical manipulation of data performed by said control means comprises summation of said data whereby each said result is a sum.

3. A data logger according to claim 1, wherein said transfer means and said control means are constituted by a microprocessor.

4. A data logger according to claim 1, including a mode sensor for putting the logger into a data logging mode if said mode sensor senses that the logger is coupled to a data source and for putting the logger into a data interrogation mode if said mode sensor senses that the logger is coupled to a support station capable of reading data stored in said data memory.

5. A data logger according to claim 4, wherein said mode sensor comprises means responsive to magnetic fields produced by said data source and said support station.

6. A data logger according to claim 4, including a pulse generator connected to said mode sensor to produce a first pulse signal when the logger is in said data logging mode and to produce a second pulse signal when the logger is in said data interrogation mode, a coil capable of being magnetically coupled with a coil in said data source or a coil in said support station to form a transformer coupling the logger to the data source or the support station, said coil of said data logger being coupled to receive said first or second pulse signal, means responsive to modulation of the pulses of said first pulse signal by data applied by said data source to said transformer formed by said coil of the logger and said coil of the data source when the logger is in said data logging mode to reconstitute the data for application to said data acccumulating means, and means arranged to be energized when the logger is in said dta interrogation mode to supply the data stored in said data memory to said pulse generator, said pulse generator modulating said second pulse signal with said stored data whereby the stored data can be passed to said support station via said transformer formed by said coil of the logger and said coil of said support station.

7. A data logger according to claim 6, wherein said first pulse signal is of a relatively low frequency and said second pulse signal is of a relatively high frequency.

8. A data logger according to claim 1, including means for storing in said data memory data indicative of said arbitrary commencement time of logging, an arbitrary time at which logging is stopped, and the value of the predetermined intervals at the time at which logging is stopped.

* * * * *